US012327494B2

(12) United States Patent
Choi et al.

(10) Patent No.: US 12,327,494 B2
(45) Date of Patent: Jun. 10, 2025

(54) APPARATUS AND METHOD FOR PROVIDING QUESTIONS FOR LEARNING

(71) Applicant: WOONGJIN THINKBIG CO., LTD., Paju-si (KR)

(72) Inventors: Samrak Choi, Paju-si (KR); Uiyoung Kim, Paju-si (KR); Byeongun Kim, Paju-si (KR)

(73) Assignee: WOONGJIN THINKBIG CO., LTD., Paju-si (KR)

(*) Notice: Subject to any disclaimer, the term of this patent is extended or adjusted under 35 U.S.C. 154(b) by 947 days.

(21) Appl. No.: 17/468,484

(22) Filed: Sep. 7, 2021

(65) Prior Publication Data

US 2022/0076585 A1 Mar. 10, 2022

(30) Foreign Application Priority Data

Sep. 8, 2020 (KR) .................. 10-2020-0114712

(51) Int. Cl.
*G09B 7/08* (2006.01)
*G06F 3/01* (2006.01)
*G09B 5/02* (2006.01)

(52) U.S. Cl.
CPC .............. *G09B 7/08* (2013.01); *G06F 3/013* (2013.01); *G09B 5/02* (2013.01)

(58) Field of Classification Search
CPC .... G09B 7/08; G09B 5/02; G09B 7/04; G06F 3/013; G06V 40/18; H04N 23/611
USPC ........................................................ 434/322
See application file for complete search history.

(56) References Cited

U.S. PATENT DOCUMENTS

| 7,173,621 | B2* | 2/2007 | Reber ................ G09G 3/20 345/169 |
| 11,164,473 | B2* | 11/2021 | Byron ................ G09B 7/08 |
| 2015/0125845 | A1* | 5/2015 | Cho .................. G09B 7/04 434/353 |

FOREIGN PATENT DOCUMENTS

| KR | 10-2013-0082839 A | 7/2013 |
| KR | 10-2064871 B1 | 1/2020 |
| KR | 10-2123120 B1 | 6/2020 |

OTHER PUBLICATIONS

Li, Xiang, Rabih Younes, Diana Bairaktarova, and Qi Guo. 2020. "Predicting Spatial Visualization Problems' Difficulty Level from Eye-Tracking Data" Sensors 20, No. 7: 1949. https://doi.org/10.3390/s20071949 (Year: 2020).*
KR Office Action dated Sep. 29, 2020 as received in Application No. 10-2020-0114712.

* cited by examiner

*Primary Examiner* — Xuan M Thai
*Assistant Examiner* — Zachary Joseph Pollock
(74) *Attorney, Agent, or Firm* — Maschoff Brennan

(57) ABSTRACT

Disclosed are an apparatus and method for providing questions for learning, which can determine the question solving type of a learner during a question solving process, and change the output form of a question based on the question solving type. The apparatus and method may output a learning screen on which the text and problem of a question are outputted at different time points according to the question solving type of a learner, continuously determine the question solving type of the learner through eye tracking, and update the question solving type of the learner.

14 Claims, 9 Drawing Sheets

APPARATUS AND METHOD FOR PROVIDING QUESTIONS FOR LEARNING

TECHNICAL FIELD

The present disclosure relates to an apparatus and method for providing questions for learning, and more particularly, to an apparatus and method for providing questions for learning, which can provide one learning question in different forms depending on learners.

BACKGROUND ART

So far, education has been conducted mainly in an offline manner that a teacher or processor teaches learners in a school or institute. Recently, however, with the development of communication technology and the change in environment (for example, COVID-19), much interest is paid to the importance of untact or online learning in which a learner does not move but uses communication, and the untact or online learning is being applied to actual learning.

With the increase in demand for a customized learning providing service, the online learning checks the learning tendency, learning level and the like of a learner through a learning process, and supports a learning process optimized to the learner through big data analysis. That is, the online learning determines the experienced difficulty of the learner, a predicted percentage of answers, a proper solving time and the like through big data analysis, and provides customized questions according to the learning tendency, learning level and the like of the learner, unlike offline study books that provide standardized questions.

Learners accept the same question in various types depending on learning methods, personal learning levels and the like. For example, a certain learner reads the text of a question accurately, but does not properly solve the question, and a certain learner solves a question without reading the text of the question properly.

As such, the learners solve the same question in different types. However, the conventional online learning stays at such a level that provides standardized questions without considering the question solving types of the learners.

The contents described in the above background art is to promote understanding of the background of the invention, and may contain matters which are not prior arts already known to a person skilled in the art to which the present technology pertains.

RELATED ART DOCUMENT

Patent Document

Korean Patent No. 10-2064871

SUMMARY OF INVENTION

Technical Problem

The present disclosure is proposed to solve the above conventional problem, and an object of the present disclosure is to provide an apparatus and method for providing questions for learning, which can determine the question solving type of a learner during a question solving process, and change the output form of a question based on the question solving type.

That is, the object of the present disclosure is to provide an apparatus and method for providing questions for learning, which can suggest a question providing method suitable for a question solving type for each learner, and provide an environment in which a question is exposed according to the question solving type of a learner such that the learner can concentrate on the question, thereby raising the degree of understanding for the question and the probability that the leaner will get the answer.

Solution to Problem

To achieve the object, an apparatus for providing questions for learning according to an exemplary embodiment of the present disclosure includes: a memory configured to store instructions which, when executed, cause the apparatus to perform operations, a processor configured to, by executing the instructions in the memory, generate a learning screen on which text information and problem information are outputted at different time points, based on question information and a question solving type of a learner, output a question solving type evaluation request signal and a learning screen output signal including the learning, and output a learning evaluation request signal when an answer to a question of the learning screen is inputted; a display configured to output the learning screen in response to the learning screen output signal; and; a camera configured to generate an eye movement image by capturing an image of eye movement of the learner in response to the question solving type evaluation request signal, wherein the processor measures a question solving time on the learning screen displayed by the display, in response to the question solving type evaluation request signal, detects a sight area of the learning screen, at which the learner stares, based on the eye movement image generated by the camera, while the learning screen is outputted by the display, determines whether a learner input answer is correct or wrong, based on an answer of the question information and the learner input answer, in response to the learning evaluation request signal, and determines and updates the question solving type based on the question solving time, the correct/wrong answer evaluation result, and the sight area detected.

The memory may stores learner information including a question solving type, and the processor may update the question solving type of the memory with the question solving type determined by the processor, in response to the type determination completion signal of the processor.

The processor may detect a type determination target question based on the question solving time measured by the processor and the correct/wrong answer evaluation result of the processor, and detect, as the type determination target question, a question for which the question solving time is less than a preset question solving time and the correct/wrong answer evaluation result is a wrong answer.

The processor may determine the question solving type based on the type determination target question and the sight area detected, divide the learning screen of the type determination target question into a text area and a problem area, and determine the question solving type based on a text area ratio indicating the ratio of the time during which the sight area stays in the text area and a problem area ratio indicating the ratio of the time during which the sight area stays in the problem area.

The processor may determine that the question solving type is a text concentration type, when the text area ratio is higher than the problem area ratio, and the difference between the text area ratio and the problem area ratio exceeds a maximum reference value. When the question solving type is the text concentration type, the processor may generate a learning screen on which the problem information is displayed before the text information.

The processor may determine that the question solving type is a problem concentration type, when the text area ratio is lower than the problem area ratio, and the difference between the text area ratio and the problem area ratio is less than a minimum reference value. When the question solving type is the problem concentration type, the processor may generate a learning screen on which the text information is displayed before the problem information. At this time, the processor may generate a learning screen on which a sentence constituting the text information is divided into a plurality of word segments, and the plurality of word segments are outputted with time differences provided therebetween.

The processor may determine that the question solving type is a mixed concentration type, when the difference between the text area ratio and the problem area ratio is equal to or more than a minimum reference value and equal to or less than a maximum reference value. When the question solving type is the mixed concentration type, the processor may generate a learning screen on which the text information and the problem information are outputted at the same time.

To achieve the object, a method for providing questions for learning, using a learning question providing apparatus, according to an exemplary embodiment of the present disclosure includes: detecting question information including text information, problem information and an answer; generating a learning screen on which the text information and the problem information are outputted at different time points, based on a question solving type of the question information detected in the detecting of the question information; outputting the learning screen generated in the generating of the learning screen; measuring a question solving time when the learning screen is outputted in the outputting of the learning screen; detecting a sight area of the learning screen, at which the learner stares while the learning screen is outputted, based on eye movement of the learner, when the learning screen is outputted in the outputting of the learning screen; determining whether a learner input answer is correct or wrong, based on the answer of the question information detected in the detecting of the question information and the learner input answer, when the learner input answer is inputted as a response to the learning screen; and updating a question solving type based on the question solving time measured at the measuring of the question solving time, the correct/wrong answer evaluation result of the determining of whether the learner input answer is correct or wrong, and the sight area detected in the detecting of the sight area.

The generating of the learning screen may include: generating a learning screen on which the problem information is displayed before the text information, when the question solving type is a text concentration type; and generating a learning screen on which the text information is displayed before the problem information, when the question solving type is a problem concentration type. The generating of the learning screen may further include generating a learning screen on which the text information and the problem information are displayed at the same time, when the question solving type is a mixed concentration type.

The generating of the learning screen may include generating a learning screen on which a sentence constituting the text information is divided into a plurality of word segments, and the plurality of word segments are outputted with time differences provided therebetween, when the question solving type is a text concentration type.

The updating of the question solving type may include: detecting a type determination target question based on the question solving time and the correct/wrong answer evaluation result; dividing a learning screen, corresponding to the type determination target question detected in the detecting of the type determination target question, into a text area and a problem area; and determining a question solving type based on the sight area corresponding to the type determination target question detected in the detecting of the type determination target question and the learning screen divided into the text area and the problem area in the dividing of the learning screen.

The detecting of the type determination target question may include detecting, as the type determination target question, a question for which the question solving time is less than a preset question solving time and the correct/wrong answer evaluation result is a wrong answer.

The determining of the question solving type may include determining the question solving type based on a text area ratio indicating the ratio of the time during which the sight area stays in the text area and a problem area ratio indicating the ratio of the time during which the sight area stays in the problem area.

The determining of the question solving type may include determining that the question solving type is a text concentration type, when the text area ratio is higher than the problem area ratio, and the difference between the text area ratio and the problem area ratio exceeds a maximum reference value, determining that the question solving type is a problem concentration type, when the text area ratio is lower than the problem area ratio, and the difference between the text area ratio and the problem area ratio is less than a minimum reference value, and determining that the question solving type is a mixed concentration type, when the difference between the text area ratio and the problem area ratio is equal to or more than a minimum reference value and equal to or less than a maximum reference value.

Advantageous Effects

According to the present disclosure, the apparatus and method for providing questions for learning may change the output form of a question based on the question solving type of a learner, such that the learner can understand the question better, and concentrate on solving the question.

Furthermore, the apparatus and method for providing questions for learning may provide a learning screen on which the text and problem of one question are displayed at different time points according to the question solving type of a learner. Therefore, a text concentration-type or problem concentration-type learner can understand a question better than in a question format exposed through the conventional method (the mixed concentration type), and make up for a weak portion of question analysis. Through this process, the apparatus and method may enable a learner to exhibits his/her ability sufficiently, thereby raising the possibility that the learner can get the answer.

DESCRIPTION OF EMBODIMENTS

Hereafter, exemplary embodiments will be described with reference to the accompanying drawings, in order to describe the technical idea of the present disclosure in detail such that a person skilled in the art to which the present disclosure pertains can easily carry out the technique idea of the present disclosure. First, it should be noted that the same components in the drawings are represented by like reference numerals even though the same components are illustrated in different drawings. Moreover, in describing the present disclosure, detailed descriptions for publicly known functions or configurations related to the present disclosure will be ruled out in order not to unnecessarily obscure the subject matters of the present disclosure.

Those skilled in the art will appreciate that various exemplary blocks, apparatuses, modules or operations described in connection with the configurations disclosed in the present specification may be implemented by electronic hardware, computer software, or a combination thereof. These blocks, apparatuses, modules or operations may be implemented or performed using a processor. The processor may be implemented by a combination of computing devices such as, a digital signal processor (DSP), an application-specific integrated circuit (ASIC) or an application-specific standard product (ASSP), a field-programmable gate array (FPGA) or other programmable logic device, an individual gate or transistor logic, an individual hardware component or any combination thereof designed to produce a configuration as disclosed in the present specification.

The processor may perform certain operation by executing a computer software stored in a memory device. The memory device may includes at least one of a random access memory (RAM), a read-only memory (ROM), a non-volatile RAM such as a flash RAM, an erasable and programmable ROM (EPROM), an electrically erasable and programmable ROM (EEPROM), a register, a hard disk, a removable disk, a CD-ROM, or any other form of storage medium known in the art. The memory device may be coupled with the processor, and the processor may read information from the memory device and write the information to the memory device. Alternatively, the memory device may be integral with the processor.

Figure 1:
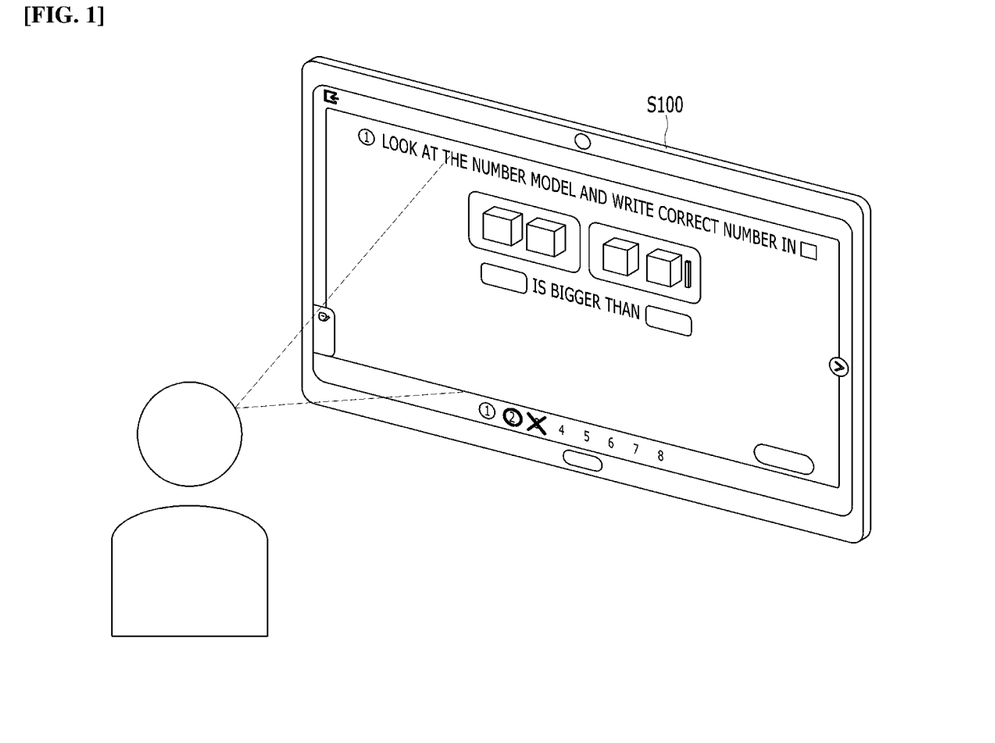
FIGS. 1 and 2 are diagrams for describing an apparatus for providing questions for learning in accordance with an embodiment of the present disclosure.

Referring to FIG. 1, an apparatus 100 for providing questions for learning (hereafter, referred to as a learning question providing apparatus 100) in accordance with an embodiment of the present disclosure is configured as a smart phone, a tablet computer, a desktop computer or the like. The learning question providing apparatus 100 determines the question solving type of a learner in a learning process, and outputs a question in various forms according to the question solving type.

Figure 2:
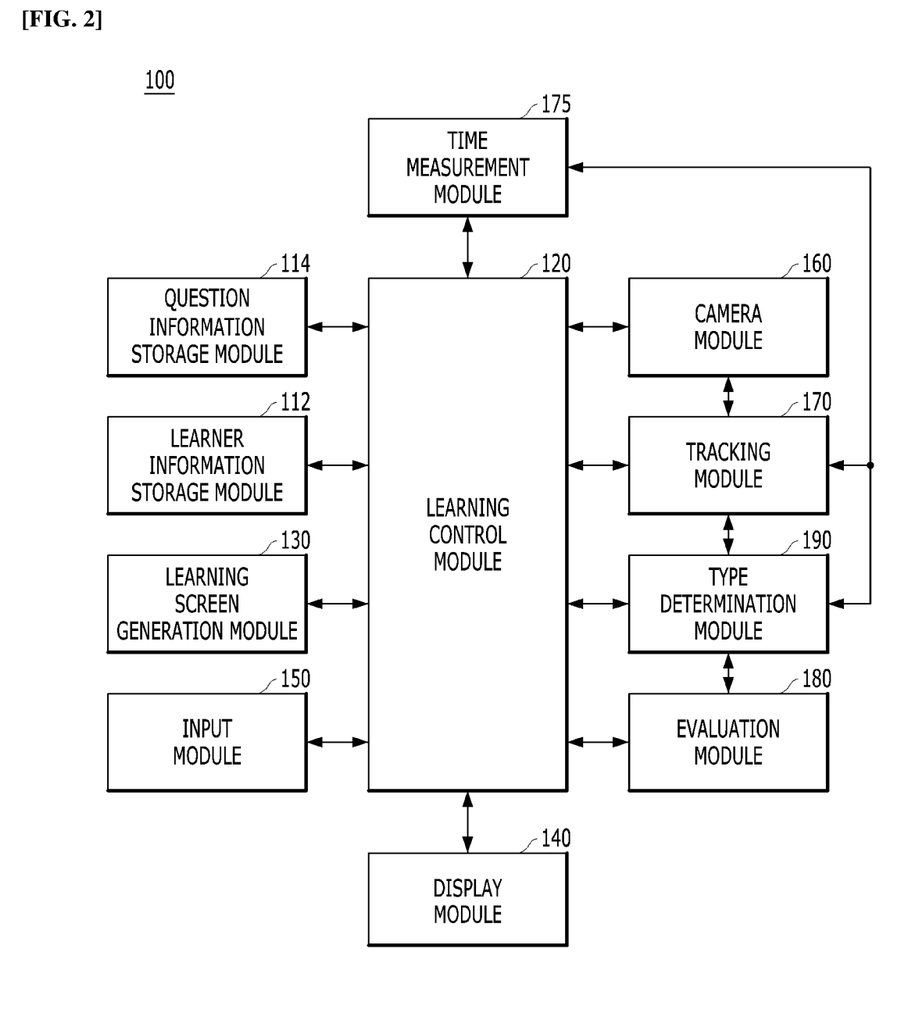

Referring to FIG. 2, the learning question providing apparatus 100 includes a learner information storage module 112, a question information storage module 114, a learning control module 120, a learning screen generation module 130, a display 140, an input device 150, a camera 160, a tracking module 170, a time measurement module 175, an evaluation module 180 and a type determination module 190.

As described in advance, the operations or configuration of the learning control module 120, the learning screen generation module 130, the tracking module 170, the time measurement module 175, the evaluation module 180 and the type determination module 190 could be understood as operations or configuration of at least one of processor. The processor may perform the operations by executing instructions in a computer program stored in a memory device.

Also, as described in advance, the operations or configuration of the learner information storage module 112 and the question information storage module 114 could be understood as operations or configuration of one or more processor and one or more memory. The processor may store data or information in the memory and retrieve or delete data or information from the memory device.

The learner information storage module 112 stores learner information related to learning. The learner information storage module 112 may store learner information which further includes the ID, password, learning level and the like of a learner.

The learner information storage module 112 stores learner information including the question solving type of a learner. The learner information storage module 112 stores learner information including one question solving type of a mixed concentration type, a text concentration type and a problem concentration type. At this time, when the question solving type of a learner is not set, the learner information storage module 112 stores the mixed concentration type as the question solving type.

The learner information storage module 112 detects (or retrieve) a learning stage and the question solving type in response to a learner information request signal of the learning control module 120, and transmits a response signal to the learning control module 120, the response signal including the detected learning stage and question solving type.

The learner information storage module 112 updates the learner information in response to a type update request signal of the learning control module 120. The learner information storage module 112 detects the question solving type from the type update request signal, updates the question solving type of the learner information stored therein with the detected question solving type, and stores the updated question solving type.

The question information storage module 114 stores question information on a question provided to the learner. The question information storage module 114 stores the question information associated with a learning stage, text information, problem information and an answer. At this time, the text information and the problem information may be configured as one of a text and an image or a combination of a text and an image.

The question information storage module 114 transmits a response signal including the question information to the learning control module 120 in response to a question information request signal of the learning control module 120. That is, the question information storage module 114 detects (or retrieve) the learning stage from the question information request signal, and transmits a response signal to the learning control module 120, the response signal including the question information corresponding to the detected learning stage. At this time, the question information storage module 114 transmits the response signal to the learning control module 120, the response signal including the question information associated with the text information, the problem information and the answer.

When learning is started, the learning control module 120 generates the learner information request signal and transmits the generated learner information request signal to the learner information storage module 112. The learning control module 120 receives a response signal including the learning stage and the question solving type as a response to the learner information request signal.

The learning control module 120 detects the learning stage from the response signal. The learning control module 120 generates the question information request signal including the learning stage, and transmits the generated question information request signal to the question information storage module 114. The learning control module 120 receives a response signal as a response to the question information request signal, the response signal including the question information associated with the text information, the problem information and the answer.

The learning control module 120 detects the question solving type from the response signal to the learner information request signal. The learning control module 120 detects the text information and the problem information from the response signal to the question request signal. The learning control module 120 generates a learning screen generation signal including the question solving type, the text information and the problem information, and transmits the generated learning screen generation signal to the learning screen generation module 130.

The learning control module 120 receives a learning screen generation completion signal, which is a response signal to the learning screen generation signal, from the learning screen generation module 130. The learning control module 120 detects a learning screen from the learning screen generation completion signal, and transmits a question output signal including the learning screen to the display 140.

In addition, when the learning screen is outputted from the display 140, the learning control module 120 transmits a question solving type evaluation request signal to the camera 160, the tracking module 170, the time measurement module 175 and the type determination module 190.

The learning control module 120 detects the answer from the response signal to the question request signal. The learning control module 120 detects, as a learner input answer, an answer from an answer input completion signal of the input device 150. The learning control module 120 generates a learning evaluation request signal including the detected answer and the learner input answer, and transmits the generated learning evaluation request signal to the evaluation module 180.

The learning control module 120 generates the type update request signal in response to a type determination completion signal of the type determination module 190. The learning control module 120 detects the question solving type from the type determination completion signal. The learning control module 120 generates the type update request signal including the detected question solving type, and transmits the generated type update request signal to the learner information storage module 112.

The learning screen generation module 130 generates a learning question in response to the learning screen generation signal of the learning control module 120. The learning screen generation module 130 detects the question solving type, the text information and the problem information from the learning screen generation signal. The learning screen generation module 130 generates a learning screen on which the display of the text information and the problem information is set differently on the basis of the question solving type.

The learning screen generation module 130 generates the learning screen on which the text information and the problem information are displayed at the same time, when the question solving type is the mixed concentration type. When the question solving type is the mixed concentration type, it indicates that the corresponding learner reads the text and problem properly, or the question solving type is not yet set. Thus, the learning screen generation module 130 generates the learning screen on which the text information and the problem information are displayed at the same time.

When the question solving type is the text concentration type, the learning screen generation module 130 generates the learning screen on which the problem information is first displayed and the text information is then displayed in case that a preset condition such as a preset time or user input is satisfied. When the question solving type is the text concentration type, it indicates that the corresponding learner reads the text properly, but solves the problem without reading the problem properly. Thus, the learning screen generation module 130 generates the learning screen on which the problem information is first displayed and the text information is then displayed, so that the learner can concentrate on the problem.

When the question solving type is the problem concentration type, the learning screen generation module 130 generates the learning screen on which the text information is first displayed and the problem information is then displayed in case that a preset condition such as a preset time or user input is satisfied. When the question solving type is the problem concentration type, it indicates that the corresponding learner reads the problem properly, but solves the problem without reading the text properly. Thus, the learning screen generation module 130 generates the learning screen on which the text information is first displayed and the problem information is then displayed, so that the learner can concentrate on the text.

The learning screen generation module 130 may not output the entire text information, but output the text in a stepwise manner. That is, the learning screen generation module 130 does not output the entire text (sentence) at a time, but divides the text into a plurality of word segments on the basis of spacing words, such that the learner can further concentrate on the text. Then, the learning screen generation module 130 sequentially outputs the word segments.

Figure 3:
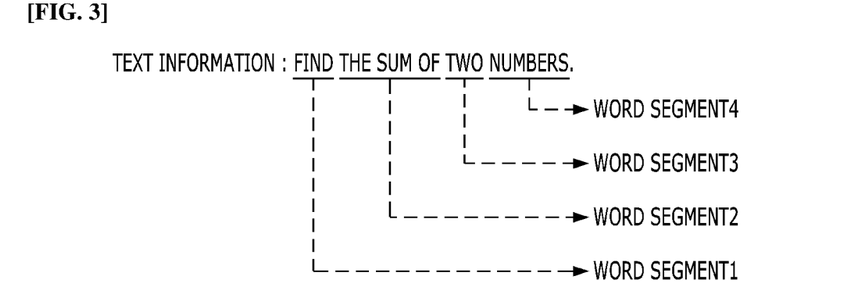
FIG. 3 is a diagram for describing a learning screen generation module of FIG. 2.

For example, referring to FIG. 3, the text of the question may be "Find the sum of two numbers". In this case, the learning screen generation module 130 divides the text into "Find", "the sum of", "two" and "numbers" which are set to word segments 1 to 4, and sequentially outputs the word segments 1 to 4. At this time, the learning screen generation module 130 outputs the word segments at preset time intervals, or outputs the next word segment when the learner inputs predetermined information through the input device 150.

The learning screen generation module 130 generates the learning screen generation completion signal including the generated learning screen. The learning screen generation module 130 transmits the learning screen generation completion signal, which is a response signal to the learning screen generation signal, to the learning control module 120.

The display 140 outputs the learning screen in response to the question output signal of the learning control module 120. The display 140 detects the learning screen from the question output signal, and outputs the detected learning screen.

Figure 4:
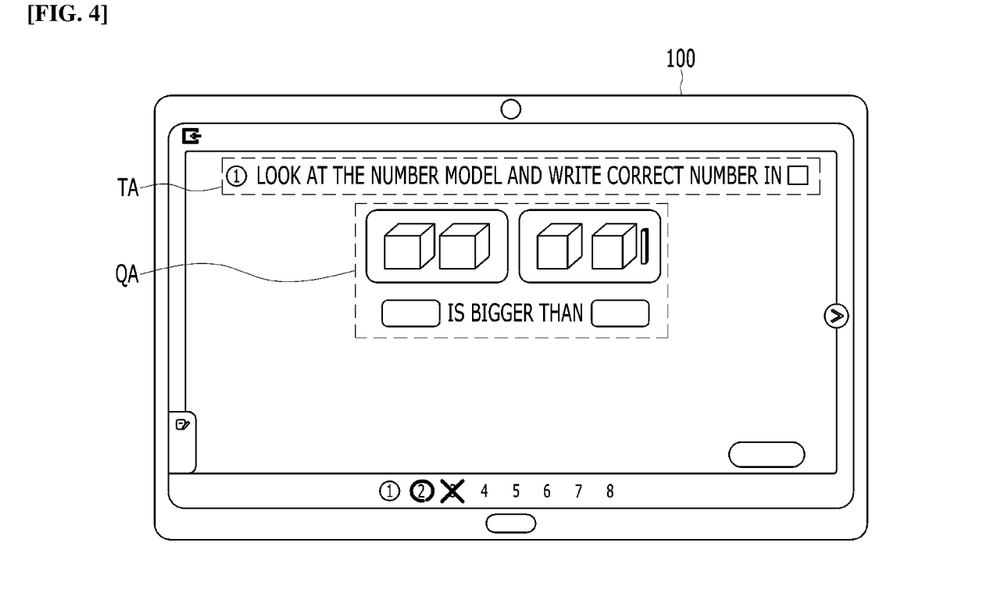
FIGS. 4 to 6 are diagrams for describing learning screens outputted through a display of FIG. 2.

For example, FIG. 4 illustrates the case in which the question solving type is the mixed concentration type, i.e. the case in which the question solving type is not set or the corresponding learner reads the text and problem properly and solves the problem. In this case, the display 140 outputs a learning screen including a learning question in which text information and problem information are displayed at the same time.

Figure 5:
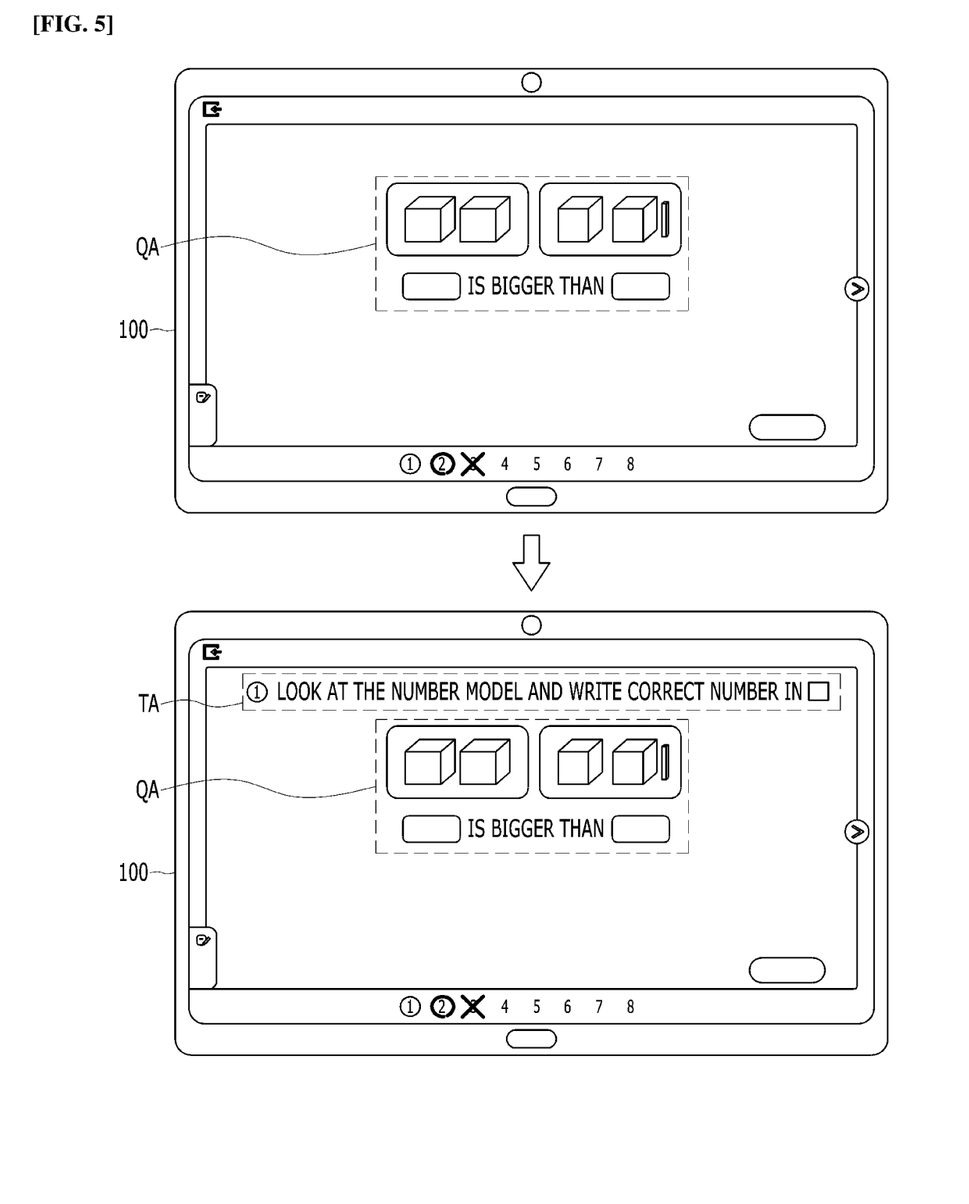

For another example, FIG. 5 illustrates the case in which the question solving type is the text concentration type, i.e. the case in which the corresponding learner solves a problem without reading the problem properly. In this case, the display 140 first outputs problem information, and then outputs text information when a preset condition such as a preset time or user input is satisfied.

Figure 6:
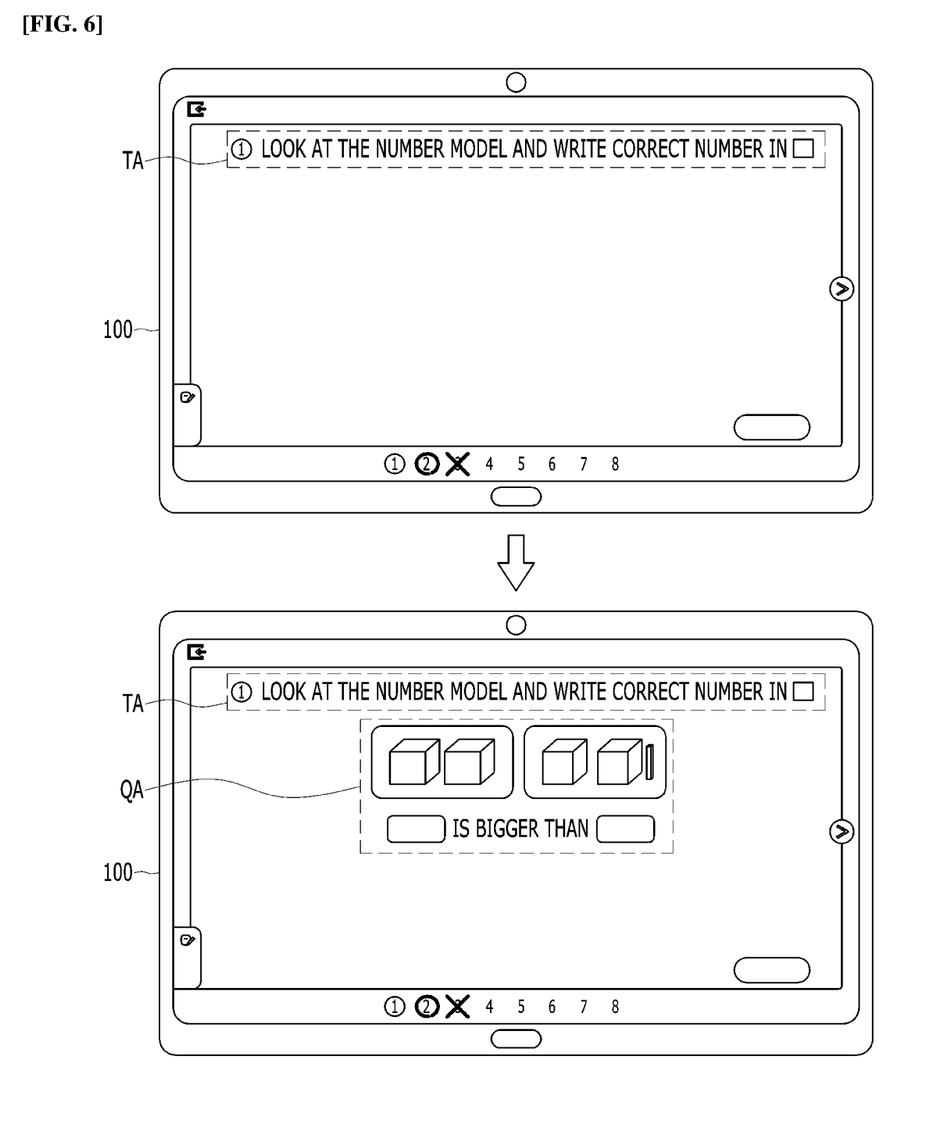

For another example, FIG. 6 illustrates the case in which the question solving type is the problem concentration type, i.e. the case in which the corresponding learner solves a problem without reading a text properly. In this case, the display 140 first outputs text information, and then outputs problem information when a preset condition such as a preset time or user input is satisfied.

The input device 150 receives an answer to the question of the learning screen outputted by the display 140. The input device 150 generates an answer input completion signal including the input answer, and transmits the generated answer input completion signal to the learning control module 120.

The input device 150 may receive control information to sequentially output learning screens.

The camera 160 is driven in response to the question solving type evaluation request signal of the learning control module 120. The camera 160 captures an image of eye movement of the learner who stares at the learning question providing apparatus 100, and stores the captured image as an eye movement image. The camera 160 cuts the captured eye movement image in units of frames or preset times, and transmits the cut eye movement images to the tracking module 170.

The tracking module 170 is driven in response to the question solving type evaluation request signal of the learning control module 120. The tracking module 170 detects a sight area corresponding to the coordinate of an area, at which the learner stares, in the entire area of the learning screen outputted by the display 140, based on the eye movement image received from the camera 160. At this time, the tracking module 170 detects the sight area through eye tracking, and raises the detection accuracy of the sight area by performing calibration before the eye tracking. The tracking module 170 detects the sight area by identifying the positions and the focus of the learner's eyes through the eye tracking. While the learner solves the question, i.e. during the time period from the point of time that the learning screen is outputted by the display 140 to the point of time that the answer is inputted to the input device 150, the tracking module 170 continuously detects the sight area. The tracking module 170 transmits the detected sight area to the type determination module 190.

The time measurement module 175 is driven in response to the question solving type evaluation request signal of the learning control module 120. The time measurement module 175 measures a time required for the learner to solve the question (hereafter, referred to as a question solving time), and transmits the measured time to the type determination module 190. At this time, the time measurement module 175 measures, as the question solving time, the time period from the point of time that the learning screen is outputted by the display 140 to the point of time that the answer is inputted to the input device 150.

The evaluation module 180 determines whether the learner input answer is correct or wrong, in response to the learning evaluation request signal of the learning control module 120. The evaluation module 180 detects the learner input answer and the answer from the learning evaluation request signal, and compares the learner input answer and the answer in order to determine whether the learner input answer is correct or wrong. At this time, the evaluation module 180 determines that the learner input answer is correct, when the answer and the learner input answer are equal to each other, and determines that the learner input answer is wrong, when the answer and the learner input answer are different from each other. The evaluation module 180 transmits the correct/wrong answer evaluation result to the pattern setting module 190.

The type determination module 190 detects a type determination target question based on the question solving time measured by the time measurement module 175 and the correct/wrong answer evaluation result of the evaluation module 180. The type determination module 190 first determines the question solving time and whether the learner input answer is correct or wrong. The proper question solving time is measured differently for each question. When a learner solves a question without normally concentrating on any one of the text and the problem thereof, the question solving time of the learner is highly likely to be measured as a shorter time than the proper question solving time. Thus, the type determination module 190 detects, as the type determination target question, a question for which the question solving time is less than a preset question solving time and the correct/wrong answer evaluation result is the wrong answer.

The type determination module 190 determines the question solving type of the learner based on the sight area corresponding to the question detected as the type determination target question. The type determination module 190 divides the learning screen into a text area TA in which the text information is disposed and a problem area QA in which the problem information is disposed, and determines the question solving type of the learner based on the time during which the sight area stays in each of the text area TA and the problem area QA. At this time, the type determination module 190 determines that the question solving type of the learner is the text concentration type, when the ratio of the time during which the sight area stays in the text area TA is higher, and determines that the question solving type of the learner is the problem concentration type, when the ratio of the time during which the sight area stays in the problem area QA is higher.

Figure 7:
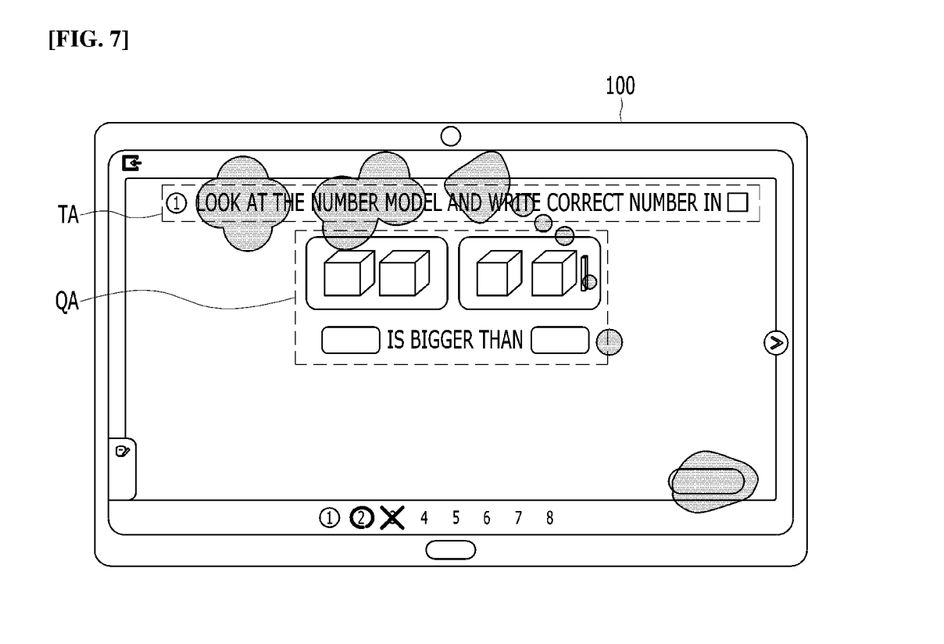
FIGS. 7 and 8 are diagrams for describing an example in which a type determination module of FIG. 2 determines a question solving type through eye tracking.
Figure 8:
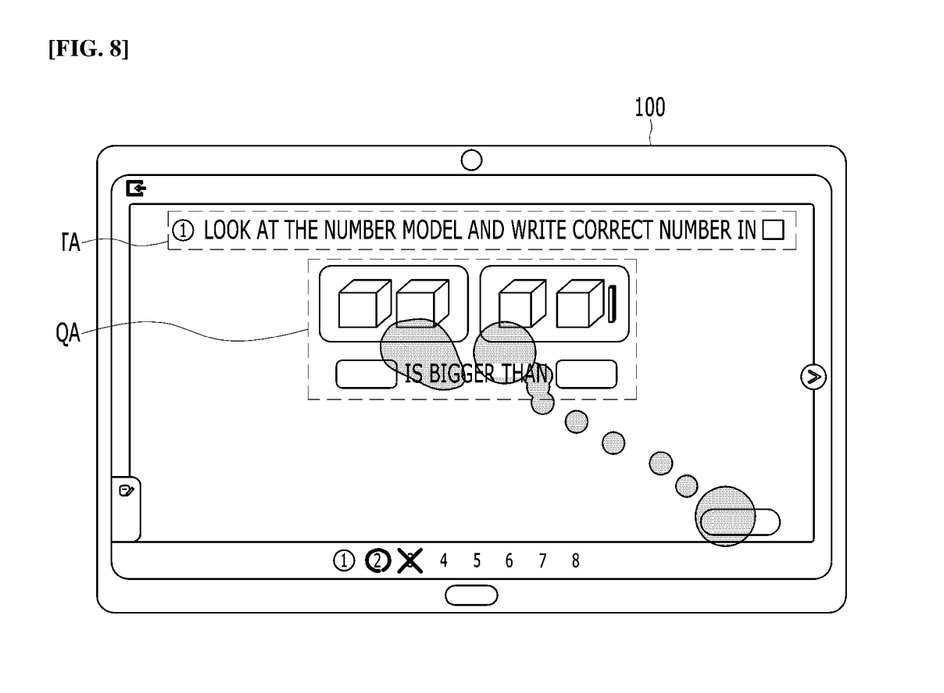

For example, when the ratio of the time during which the sight area stays in the text area TA is higher as illustrated in FIG. 7, the type determination module 190 determines that the question solving type of the learner is the text concentration type. For example, when the ratio of the time during which the sight area stays in the problem area QA is higher as illustrated in FIG. 8, the type determination module 190 determines that the question solving type of the learner is the problem concentration type.

When the ratio of the time during which the sight area stays in the text area TA to the time during which the sight area stays in the problem area QA falls within a preset range, the type determination module 190 may determine that the question solving type of the learner is the mixed solving type. The type determination module 190 generates the type determination completion signal including the determined question solving type, and transmits the generated type determination completion signal to the learning control module 120.

Hereafter, a learning question providing method in accordance with an embodiment of the present disclosure will be described in detail with reference to the accompanying drawings.

Figure 9:
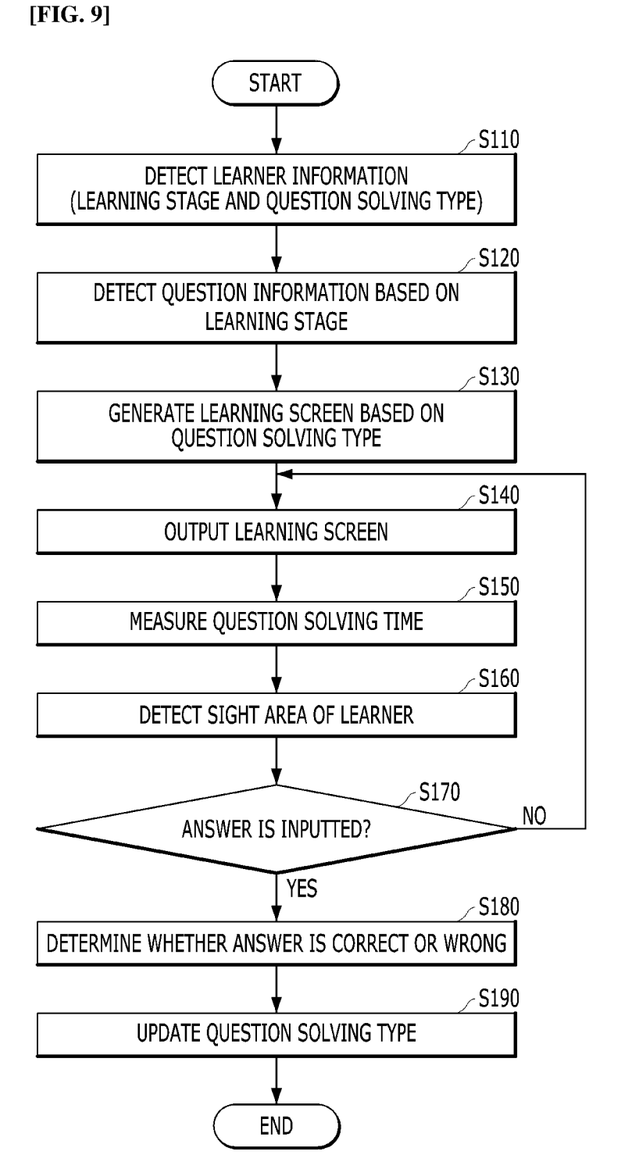
FIG. 9 is a flowchart for describing a method for providing questions for learning in accordance with an embodiment of the present disclosure.

Referring to FIG. 9, the learning question providing apparatus 100 detects learner information including a learning stage and a question solving type, when learning is started, in step S110.

The learning question providing apparatus 100 detects question information based on the learning stage of the learner information, in step S120. The learning question providing apparatus 100 detects the question information corresponding to the learning stage detected in step S110, among plural pieces of question information stored therein. At this time, the learning question providing apparatus 100 detects the question information associated with text information, problem information and an answer.

The learning question providing apparatus 100 generates a learning screen based on the question solving type of the learner information, in step S130. The learning question providing apparatus 100 generates the learning screen including the text information and the problem information, which are differently displayed on the basis of the question solving type.

Figure 10:
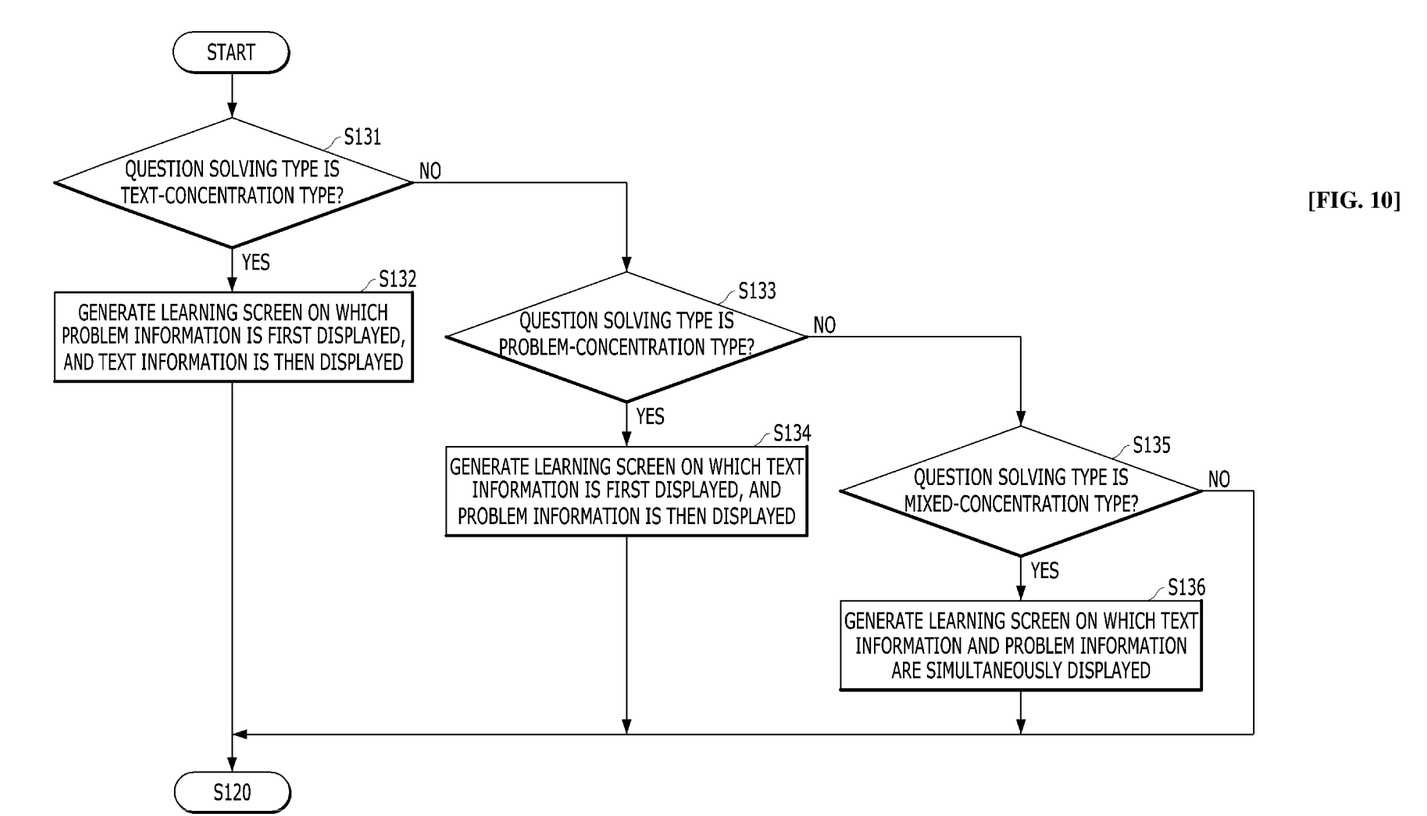
FIG. 10 is a flowchart for describing a learning screen generation step S130 of FIG. 9.

Referring to FIG. 10, when the question solving type of the learner is the text concentration type (Yes in step S131), the learning question providing apparatus 100 generates the learning screen on which the problem information is first displayed and the text information is then displayed, in step S132. When the question solving type is the text concentration type, it indicates that the corresponding learner reads the text properly but solves the problem without reading the problem properly. Thus, the learning question providing apparatus 100 generates the learning screen on which the problem information is first displayed and the text information is then displayed, so that the learner can concentrate on the problem. At this time, the learning question providing apparatus 100 generates the learning screen on which the problem information is first displayed and the text information is then displayed when a preset time elapses or a preset learner input is provided.

When the question solving type of the learner is the problem concentration type (Yes in step S133), the learning question providing apparatus 100 generates the learning screen on which the text information is first displayed and the problem information is then displayed, in step S134. When the question solving type is the problem concentration type, it indicates that the corresponding learner reads the problem properly, but solves the problem without reading the text properly. Thus, the learning question providing apparatus 100 generates the learning screen on which the text information is first displayed and the problem information is then displayed, so that the learner can concentrate on the text. At this time, the learning question providing apparatus 100 generates the learning screen on which the text information is first displayed and the problem information is then displayed when a preset time elapses or a preset learner input is provided.

The learning question providing apparatus 100 may generate the learning screen on which the entire text information is not displayed at the same time, but displayed in a stepwise manner, in step S134. That is, the learning question providing apparatus 100 generates the learning screen on which the entire text (sentence) is not outputted at a time, but the text is divided into a plurality of word segments based on spacing words and the word segments are sequentially displayed, so that the learner can further concentrate on the text.

The learning question providing apparatus 100 outputs the learning screen generated in the step S130, in step S140. When the question solving type is the mixed concentration type, it indicates that the question solving type is not set or the corresponding learner reads the text and problem properly and solves the problem. Thus, the learning question providing apparatus 100 outputs the learning screen on which the text information and the problem information are displayed at the same time.

When the question solving type is the text concentration type, it indicates that the corresponding learner solves the problem without reading the problem properly. Thus, the learning question providing apparatus 100 outputs the learning screen on which the problem information is first displayed and the text information is then displayed when a preset condition such as a preset time or learner input is satisfied.

When the question solving type is the problem concentration type, it indicates that the corresponding learner solves the problem without reading the text properly. Thus, the learning question providing apparatus 100 outputs the learning screen on which the text information is first displayed and the problem information is then displayed when a preset condition such as a preset time or learner input is satisfied.

In addition, when the learning screen is outputted, the learning question providing apparatus 100 measures a question solving time in step S150. The learning question providing apparatus 100 measures, as the question solving time, the time period from the point of time that the learning screen is outputted to the point of time that an answer of the learner is inputted.

In addition, the learning question providing apparatus 100 detects the sight area of the learner through eye tracking, while the learner solves the question, in step S160. That is, the learning question providing apparatus 100 captures an image of eye movement of the learner who stares at the learning screen, and stores the captured image as an eye movement image. The learning question providing apparatus 100 detects a sight area, corresponding to the coordinate of the area at which the learner stares, in the entire area of the learning screen based on the eye movement image. At this time, the learning question providing apparatus 100 detects the sight area through eye tracking, and raises the detection accuracy of the sight area by performing calibration before the eye tracking. The learning question providing apparatus 100 detects the sight area by identifying the positions and focus of the learner's eyes through eye tracking, and continuously detects the sight area while the learner solves the question, i.e. during the time period from the point of time that the learning screen is outputted to the point of time that the answer of the learner is inputted.

The learning question providing apparatus 100 repeatedly performs steps S140, S150 and S160 until an answer is inputted by the learner. When the answer is inputted by the learner (Yes in step S170), the learning question providing apparatus 100 determines whether the answer inputted by the learner, i.e. the learner input answer, is correct or wrong, in step S180. The learning question providing apparatus 100 compares the answer of the question information to the learner input answer, and determines whether the learner input answer is correct or wrong. At this time, the learning question providing apparatus 100 determines that the learner input answer is correct when the answer of the question information and the learner input answer are equal to each other, and determines that the learner input answer is wrong when the answer of the question information and the learner input answer are different from each other.

The learning question providing apparatus 100 updates the question solving type of the learner in step S180. The learning question providing apparatus 100 updates the question solving type of the learner based on the question solving time, the correct/wrong answer evaluation result and the sight area. At this time, the learning question providing apparatus 100 sets one of the mixed concentration type, the text concentration type and the problem concentration type to the question solving type, in order to update the question solving type of the learner information.

Figure 11:
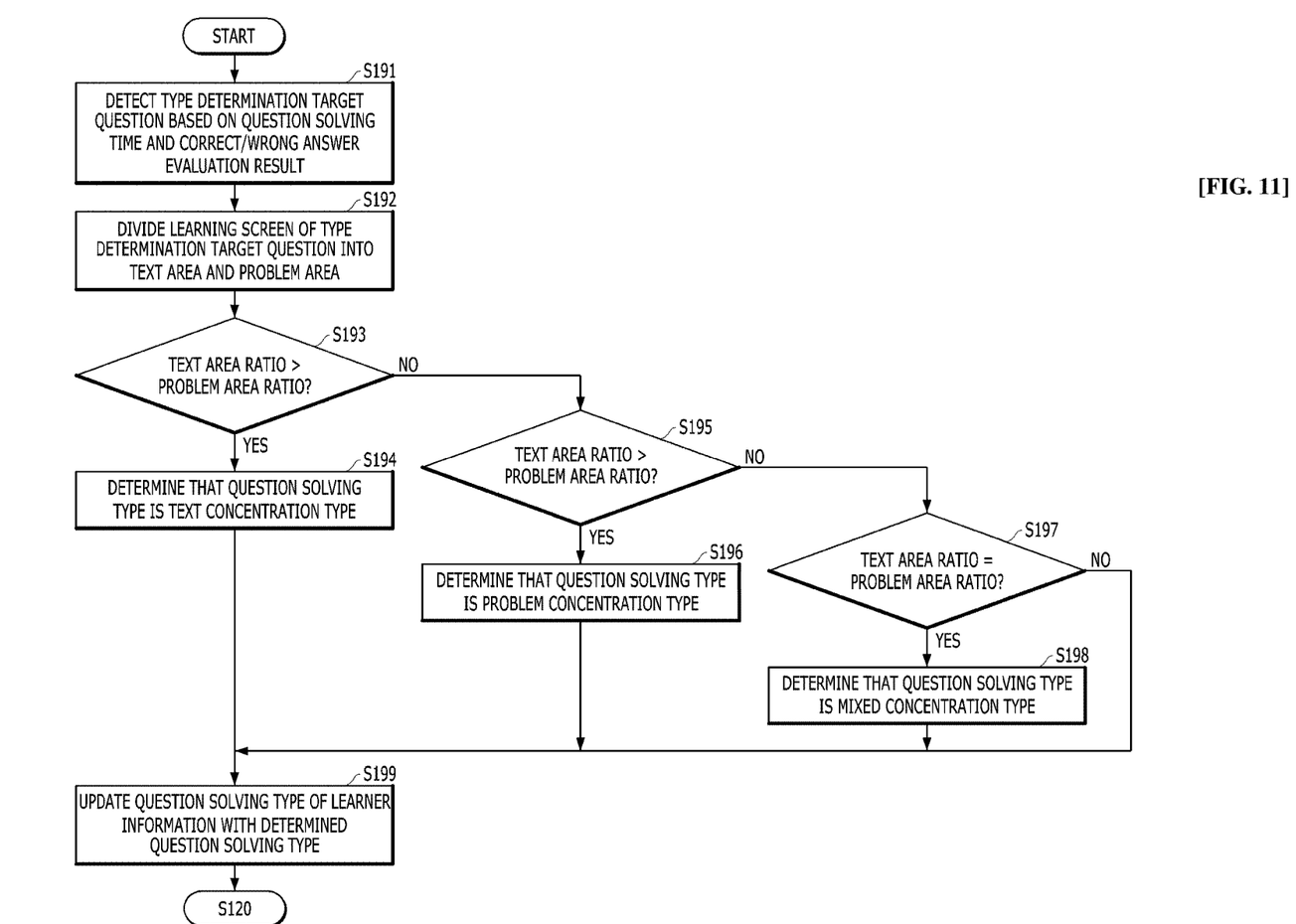
FIG. 11 is a flowchart for describing a question solving type update step S190 of FIG. 9.

Referring to FIG. 11, the learning question providing apparatus 100 detects a type determination target question based on the question solving time and the correct/wrong answer evaluation result, in step S191. The learning question providing apparatus 100 detects the type determination target question based on the question solving time measured in step S150 and the correct/wrong answer evaluation result of the evaluation module 180.

When a learner solves a question without properly concentrating on any one of the text and the problem thereof, the question solving time of the learner is highly likely to be measured as a shorter time than a proper question solving time. Thus, the learning question providing apparatus 100 detects, as the type determination target question, a question for which the question solving time is less than a preset question solving time and the correct/wrong answer evaluation result is a wrong answer. At this time, the proper question solving time for each question is differently set. Thus, the proper question solving time may have a different value for each question.

The learning question providing apparatus 100 divides the learning screen of the type determination target question into a text area TA and a problem area QA in step S192. At this time, the learning question providing apparatus 100 identifies an area of the learning screen, in which the text information is disposed, as the text area TA, and identifies an area of the learning screen, in which the problem information is disposed, as the problem area QA.

The learning question providing apparatus 100 determines the question solving type of the learner based on the learning screen and the sight area corresponding to the question detected as the type determination target question. When the ratio of the time during which the sight area stays in the text area TA (hereafter, referred to as a text area ratio) is higher than the ratio of the time during which the sight area stays in the problem area QA (hereafter, referred to as a problem area ratio) (Yes in step S193), the learning question providing apparatus 100 determines that the question solving type of the learner is the text concentration type, in step S194.

At this time, when comparing the problem area ratio and the text area ratio in step S193 to determine the question solving type, the learning question providing apparatus 100 may set a maximum reference value and a minimum reference value.

When the difference between the text area ratio and the problem area ratio is less than the minimum reference value, the learning question providing apparatus 100 may determine that the problem area ratio is higher than the text area ratio.

When the problem area ratio is higher than the text area ratio (Yes in step S195), the learning question providing apparatus 100 determines that the question solving type of the learner is the problem concentration type, in step S196. At this time, when comparing the problem area ratio and the text area ratio in step S195 to determine the question solving type, the learning question providing apparatus 100 may set the maximum reference value and the minimum reference value. When the difference between the text area ratio and the problem area ratio exceeds the maximum reference value, the learning question providing apparatus 100 may determine that the text area ratio is higher than the problem area ratio.

When the problem area ratio and the text area ratio are equal to each other (Yes in step S197), the learning question providing apparatus 100 determines that the question solving type of the learner is the mixed concentration type, in step S198. At this time, when comparing the problem area ratio and the text area ratio in step S197 to determine the question solving type, the learning question providing apparatus 100 may set the maximum reference value and the minimum reference value. When the difference between the text area ratio and the problem area ratio ranges from the minimum reference value to the maximum reference value, the learning question providing apparatus 100 may determine that the problem area ratio and the text area ratio are equal to each other.

When the question solving type is completely determined, the learning question providing apparatus 100 updates the question solving type of the learner information, stored therein, with the determined question solving type in step S199. That is, the learning question providing apparatus 100 updates the question solving type of the learner information with the question solving type determined through steps S193 to S198.

The learning question providing apparatus 100 may generate the learning screen according to the updated question solving type. Therefore, a text concentration-type or problem concentration-type learner can understand a question better than in a question format exposed through the conventional method (the mixed concentration type), and make up for a weak portion of question analysis. Through this process, the learning question providing apparatus 100 enables a learner to exhibits his/her ability sufficiently, thereby maximizing the possibility that the learner can get the answer.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:

1. An apparatus for providing questions for learning, comprising:
   a memory configured to store instructions which, when executed, cause the apparatus to perform operations;
   a processor configured to, by executing the instructions stored in the memory, generate a learning screen on which text information and problem information are outputted at different time points, based on question information and a question solving type of a learner, output a question solving type evaluation request signal and a learning screen output signal including the learning screen, and output a learning evaluation request signal when an answer to a question of the learning screen is inputted; and a display configured to output the learning screen in response to the learning screen output signal; and a camera configured to generate an eye movement image by capturing an image of eye movement of the learner in response to the question solving type evaluation request signal, wherein the processor, measures a question solving time on the learning screen displayed by the display, in response to the question solving type evaluation request signal, detects a sight area of the learning screen, at which the learner stares, based on the eye movement image generated by the camera, while the learning screen is outputted by the display, determines whether a learner input answer is correct or wrong, based on an answer of the question information and the learner input answer, in response to the learning evaluation request signal, and determines and updates the question solving type based on the question solving time, the correct/wrong answer evaluation result, and the sight area detected, wherein the processor determines the question solving type based on a type determination target question and the sight area, divides the learning screen of the type determination target question into a text area and a problem area, and determines the question solving type based on a text area ratio indicating the ratio of the time during which the sight area stays in the text area and a problem area ratio indicating the ratio of the time during which the sight area stays in the problem area, wherein the processor determines that the question solving type is a text concentration type, when the text area ratio is higher than the problem area ratio, and the difference between the text area ratio and the problem area ratio exceeds a maximum reference value, wherein when the question solving type is the text concentration type, the processor generates the learning screen on which the problem information is displayed before the text information.

2. The apparatus of claim 1, to the memory stores learner information including a question solving type, wherein the processor updates the question solving type of the memory with the question solving type determined, in response to the type determination completion signal.

3. The apparatus of claim 1, wherein the processor detects the type determination target question based on the question solving time and the correct/wrong answer evaluation result, and detects, as the type determination target question, a question for which the question solving time is less than a preset question solving time and the correct/wrong answer evaluation result is a wrong answer.

4. The apparatus of claim 1, wherein the processor determines that the question solving type is a problem concentration type, when the text area ratio is lower than the problem area ratio, and the difference between the text area ratio and the problem area ratio is less than a minimum reference value.

5. The apparatus of claim 4, wherein the processor generates a learning screen on which a sentence constituting the text information is divided into a plurality of word segments, and the plurality of word segments are outputted with time differences provided therebetween.

6. The apparatus of claim 1, wherein the processor determines that the question solving type is a mixed concentration type, when the difference between the text area ratio and the problem area ratio is equal to or more than a minimum reference value and equal to or less than a maximum reference value, wherein when the question solving type is the mixed concentration type, the processor generates a learning screen on which the text information and the problem information are outputted at the same time.

7. A method for providing questions for learning, using a learning question providing apparatus, the method comprising:

detecting question information including text information, problem information and an answer;

generating a learning screen on which the text information and the problem information are outputted at different time points, based on a question solving type of the question information detected in the detecting of the question information;

outputting the learning screen generated in the generating of the learning screen;

measuring a question solving time when the learning screen is outputted in the outputting of the learning screen;

detecting a sight area of the learning screen, at which the learner stares while the learning screen is outputted, based on eye movement of the learner, when the learning screen is outputted in the outputting of the learning screen;

determining whether a learner input answer is correct or wrong, based on the answer of the question information detected in the detecting of the question information and the learner input answer, when the learner input answer is inputted as a response to the learning screen; and updating a question solving type based on the question solving time measured at the measuring of the question solving time, the correct/wrong answer evaluation result of the determining of whether the learner input answer is correct or wrong, and the sight area detected in the detecting of the sight area, wherein the generating of the learning screen comprises:

generating the learning screen on which the problem information is displayed before the text information, when the question solving type is a text concentration type, wherein the determining of the question solving type comprises determining that the question solving type is the text concentration type, when a text area ratio is higher than a problem area ratio, and the difference between the text area ratio and the problem area ratio exceeds a maximum reference value, and wherein the updating of the question solving type comprises:

determining the question solving type based on a type determination target question and the sight area;

dividing the learning screen of the type determination target question into a text area and a problem area, and wherein the determining of the question solving type comprises determining the question solving type based on a text area ratio indicating the ratio of the time during which the sight area stays in the text area and a problem area ratio indicating the ratio of the time during which the sight area stays in the problem area.

8. The method of claim 7, wherein the generating of the learning screen further comprises:
generating a learning screen on which the text information is displayed before the problem information, when the question solving type is a problem concentration type.

9. The method of claim 7, wherein the generating of the learning screen further comprises generating a learning screen on which the text information and the problem information are displayed at the same time, when the question solving type is a mixed concentration type.

10. The method of claim 7, wherein the generating of the learning screen comprises generating a learning screen on which a sentence constituting the text information is divided into a plurality of word segments, and the plurality of word segments are outputted with time differences provided therebetween, when the question solving type is a text concentration type.

11. The method of claim 7, wherein the updating of the question solving type comprises:
detecting the type determination target question based on the question solving time and the correct/wrong answer evaluation result; and
determining the question solving type based on the sight area corresponding to the type determination target question detected in the detecting of the type determination target question and the learning screen divided into the text area and the problem area in the dividing of the learning screen.

12. The method of claim 11, wherein the detecting of the type determination target question comprises detecting, as the type determination target question, a question for which the question solving time is less than a preset question solving time and the correct/wrong answer evaluation result is a wrong answer.

13. The method of claim 7, wherein the determining of the question solving type comprises determining that the question solving type is a problem concentration type, when the text area ratio is lower than the problem area ratio, and the difference between the text area ratio and the problem area ratio is less than a minimum reference value.

14. The method of claim 7, wherein the determining of the question solving type comprises determining that the question solving type is a mixed concentration type, when the difference between the text area ratio and the problem area ratio is equal to or more than a minimum reference value and equal to or less than a maximum reference value.

\* \* \* \* \*